Nov. 28, 1967     F. OTTO     3,355,152

KNEADING APPARATUS

Filed Sept. 8, 1965

INVENTOR:
FRITZ OTTO

BY

Michael J. Striker
his ATTORNEY

United States Patent Office 3,355,152
Patented Nov. 28, 1967

3,355,152
KNEADING APPARATUS
Fritz Otto, Serturnstrasse 46, Hameln (Weser), Germany
Filed Sept. 8, 1965, Ser. No. 485,794
Claims priority, application Germany, Oct. 8, 1964,
ST 22,649
16 Claims. (Cl. 259—107)

The present invention relates to kneading or agitating apparatus in general, and more particularly to improvements in kneading apparatus of the type wherein the material to be treated is preferably accommodated in a stationary container and is stirred by a kneading tool which rotates about a vertical axis coinciding with the axis of the container.

Conventional kneading apparatus of the just outlined type are not entirely satisfactory because dough or another material which is being agitated tends to creep upwardly beyond the kneading or agitating member or members of the kneading tool and is thus located outside of the range of the kneading members. Such bridging of dough in the upper central zone of the container results in non-uniform kneading action. Proposals to eliminate such bridging include the provision of an impeller disk which is located at the upper end of the kneading tool and serves to direct the dough toward the internal surface of the container side wall so that the dough descends into the range of kneading members which are normally located at level above the bottom wall of the container. However, such impeller disks, too, have proven less than fully effective.

Accordingly, it is an important object of the present invention to provide a very simple but highly effective kneading tool which may be utilized in a kneading or agitating apparatus of the above outlined characteristics and to construct the kneading tool in such a way that it automatically prevents bridging of dough or similar viscous material in the upper central zone of the container.

Another object of the invention is to provide the improved kneading tool with one or more deflecting elements of novel design which are constructed, configurated and positioned in such a way that they positively prevent accumulation and stagnation of treated material in such zone or zones which are outside of the range of the kneading members.

A further object of the invention is to provide a kneading or agitating apparatus which embodies a kneading tool of the above outlined character.

An additional object of the instant invention is to provide a kneading or agitating or mixing tool which may be used in the containers of presently known kneading apparatus and whose agitating or kneading action is not affected in any way by the provision of novel means which prevent bridging or pileup of treated material in such zones which are not accessible to the kneading members.

A concomitant object of the invention is to provide a kneading tool wherein the novel deflecting element or elements may be made integral with the remaining parts or portions of the tool so that the tool may be produced as a one-piece body.

Briefly stated, one feature of my present invention resides in the provision of a rotary kneading or agitating tool which comprises an elongated hub, at least one kneading member provided at or close to one longitudinal end of the hub, and at least one deflecting element extending from the kneading member longitudinally of and toward the other end of the hub. It is preferred to provide the hub of the kneading tool with a pair of vane- or blade-like deflecting elements which are located diametrically opposite each other and may extend all the way to the outer end face of a customary head which is often provided at the other end of the hub. That end portion of each deflecting element which is adjacent to the other end of the hub is preferably rounded or chamfered to avoid injury to the operator.

The improved kneading tool may be installed in a fixed container which resembles a bowl having a bottom wall and an annular wall extending upwardly from the bottom wall. The kneading member or members may resemble rigidly or articulately mounted blades and are provided at the lower end of the hub which is rotatable about the axis of the bowl. The deflecting element or elements extend upwardly toward the upper end of the hub of the kneading tool and deflect the material which creeps upwardly toward the upper central zone of the bowl so that such material is directed toward the internal surface of the annular wall of the bowl and descends toward the bottom wall, i.e., into the ranged of revolving kneading members.

The novel features which are considered as characteristic of the invention are set forth in particular in the appended claims. The improved kneading apparatus itself, however, both as to its construction and its mode of operation, together with additional features and advantages thereof, will be best understood upon perusal of the following detailed description of certain specific embodiments with reference to the accompanying drawings, in which:

Figure 1:
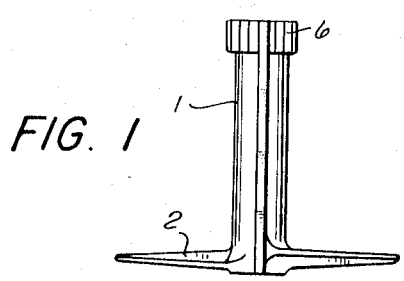
FIG. 1 is a side elevational view of a kneading tool which is constructed in accordance with a first embodiment of my invention and whose hub is integral with two kneading members.
Figure 2:
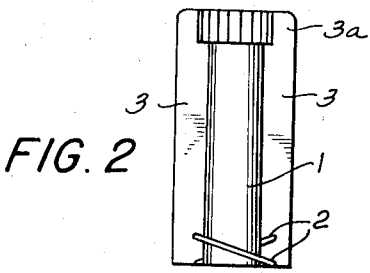
FIG. 2 is a side elevational view of the tool as seen from the left-hand side of FIG. 1.
Figure 3:
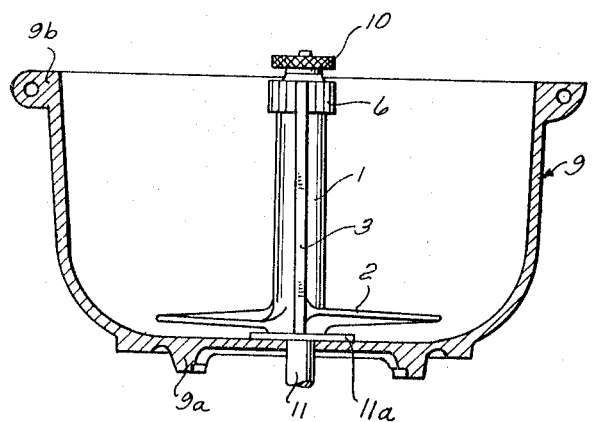
FIG. 3 is a central vertical section through the bowl-shaped container of a kneading or agitating apparatus which comprises a kneading tool of the type shown in FIG. 1 and 2.

Referring first to FIGS. 1 to 3, there is shown in FIG. 3 a fixed receptacle or container in the form of a bowl 9 having a bottom wall 9a and an upwardly extending circumferentially complete annular side wall 9b. The bottom wall 9a is traversed by a vertical drive shaft 11 which extends coaxially into the interior of the bowl and serves to drive a novel kneading tool best shown in FIGS. 1 and 2. The tool comprises an elongated hollow cylindrical hub 1 whose lower end portion carries two fixedly connected kneading or agitating members here shown as suitably inclined blades arranged to rotate in a zone closely adjacent to the upper side of the bottom wall 9a. The upper end portion 6 of the hub 1 is formed as a head which can serve as an abutment for a knurled lock nut 10, the latter being provided to press the lower end face of the hub 1 against a turntable or stop 11a on the drive shaft 11 so that the hub and the shaft 11 rotate as a unit. The motor which drives the shaft 11 is not shown in the drawings.

In accordance with my present invention, the hub 1 is provided with two longitudinally extending deflecting elements or ribs 3 which are located diametrically opposite each other and extend from the kneading members 2 toward the upper end of the hub. In fact, and as best shown in FIGS. 1 and 2, the deflecting elements 3 extend all the way to the upper end face 7 of the head 6, i.e., to that end face of the head 6 which is turned away from the kneading members 2. The upper end portions 3a of the deflecting elements 3 are preferably rounded or chamfered, see FIG. 2, to avoid injury to the hands of the operator when the hub is being connected to or disengaged from the drive shaft 11. In the embodiment of FIGS. 1 to 3, the kneading tool comprises a hub 1 which is of constant cross-section all the way between the head 6 and the kneading members 2 and which is integral with the kneading members.

Figure 4:
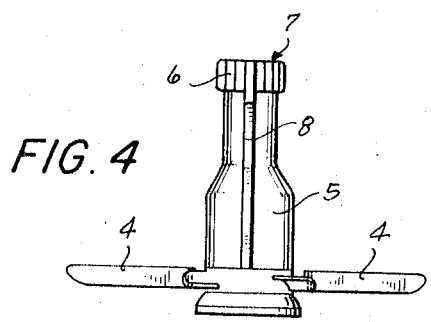
FIG. 4 is a side elevational view of a slightly modified kneading tool.
Figure 5:
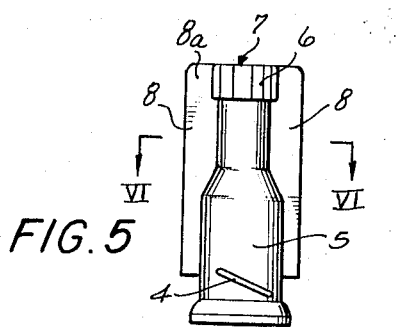
FIG. 5 is a side elevational view as seen from the left-hand side of FIG. 4.
Figure 6:
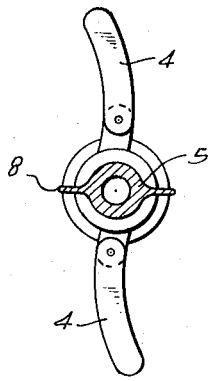
FIG. 6 is a horizontal section substantially as seen in the direction of arrows from the line VI—VI of FIG. 5.

FIGS. 4 to 6 illustrate a modified kneading tool which again comprises an elongated hollow hub 5 provided with a ribbed head 6 and with a pair of substantially sickle-shaped kneading or agitating members 4 each of which is articulately (swingably) connected to one of two lugs provided on the lower end portion of the hub 5. The deflecting elements 8 extend all the way to the upper end face 7 of the head 6 and are provided with rounded end portions 8a.

The head 6 may be replaced by an impeller disk which then assists the deflecting members 3 or 8 in directing the treated material toward the internal surface of the side wall 9b.

Extensive experiments have shown that a kneading apparatus which embodies the kneading tool of FIGS. 1–2 or 4–6 is capable of bringing about an unexpectedly satisfactory kneading or mixing action, and that such highly satisfactory kneading action is due to the presence of the deflecting elements 3 or 8. When the kneading tool is installed in the bowl 9 and the motor which drives the shaft 11 is set in operation, the viscosity of the treated material increases with progressing treatment and such material creeps along the hub 1 or 5 toward the head 6 to be immediately deflected by the elements 3 or 8 so that there is no bridging and that all parts of treated material are repeatedly returned into the range of revolving kneading members 2 or 4. The deflecting elements 3 or 8 rotate with the kneading tool and distribute the rising portions of treated material along the entire internal surface of the side wall 9b to insure that the kneading action is uniform and can be completed within a short period of time.

The hub 5 of FIGS. 4–6 comprises an upper section of smaller diameter and a lower section of greater diameter.

It is within the purview of my invention to provide the hub 1 or 5 with a single deflecting element 3 or 8 or with three or more preferably equidistant deflecting elements.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. A rotary kneading or agitating tool, comprising an elongated hub; at least one narrow, elongated transversal kneading member connected only at one end thereof to one end of said hub and freely projecting outwardly from the latter, said kneading member being arranged substantially transversally to the axis of said hub; and at least one flat narrow deflecting element projecting from said hub in a plane parallel to said axis and extending from said kneading member toward the other end of said hub.

2. A rotary kneading or agitating tool, comprising an elongated hub; at least one narrow, elongated transversal kneading member connected only at one end thereof to one end of said hub and freely projecting outwardly from the latter, said kneading member being arranged substantially transversally to the axis of said hub; and a pair of flat narrow deflecting elements each projecting from said hub in a plane parallel to said axis and extending from said kneading member toward the other end of said hub, said deflecting elements being located susbtantially diametrically opposite each other.

3. A rotary kneading or agitating tool, comprising an elongated hub; at least one narrow, elongated transversal kneading member connected only at one end thereof to one end of said hub and freely projecting outwardly from the latter, said kneading member being arranged substantially transversally to the axis of said hub; and at least one substantially wing-shaped flat narrow deflecting element projecting from said hub in a plane parallel to said axis and extending from said kneading member toward the other end of said hub.

4. A rotary kneading or agitating tool, comprising an elongated hub; at least one narrow, elongated transversal kneading member connected only at one end thereof to one end of said hub and freely projecting outwardly from the latter, said kneading member being arranged substantially transversally to the axis of said hub; and at least one flat narrow deflecting element projecting from said hub in a plane parallel to said axis and extending from said kneading member toward the other end of said hub, said deflecting element having a rounded end portion in the region of the other end of said hub.

5. A rotary kneading or agitating tool, comprising an elongated hub having a first end portion and a second end portion; at least one narrow elongated transversal kneading member connected only at one end thereof to said first end portion of the hub and freely projecting outwardly from the latter, said kneading member being arranged substantially transversally to the axis of said hub; a head provided on the other end portion of said hub and having an end face turned away from said kneading member; and at least one flat narrow deflecting element projecting from said hub in a plane parallel to said axis and extending from said kneading member to the end face of said head.

6. In a kneading apparatus, a material-receiving container having a bottom wall and a circumferentially complete side wall extending upwardly from said bottom wall; and a kneading tool mounted in said container for rotation about a substantially vertical axis, said tool comprising an elongated hub having a lower end portion nearer to and an upper end portion more distant from said bottom wall, at least one narrow, elongated transversal kneading member connected only at one end thereof to the lower end portion of said hub and freely projecting outwardly from the latter, said kneading member being arranged substantially transversally to the axis of said hub; and at least one substantially vertical flat narrow deflecting element projecting from said hub in a plane parallel to said axis and extending from said kneading member toward the upper end portion of said hub.

7. A structure as set forth in claim 6, wherein said container is a stationary bowl and wherein said axis of said kneading tool coincides with the axis of said bowl.

8. A structure as set forth in claim 6, wherein said kneading tool comprises two deflecting elements located diametrically opposite each other.

9. A structure as set forth in claim 6, wherein said deflecting element resembles a wing and extends substantially all the way to the other end portion of said hub.

10. A structure as set forth in claim 6, wherein said deflecting element comprises a rounded end portion adjacent to the upper end portion of said hub.

11. A structure as set forth in claim 6, wherein the upper end portion of said hub constitutes a head having an upper end face and wherein said deflecting element extends to said upper end face.

12. A structure as set forth in claim 6, wherein said kneading tool comprises a plurality of wing-shaped deflecting elements.

13. A structure as set forth in claim 6, wherein said hub is a hollow tube and further comprising drive means including a shaft extending through said bottom wall and into said hub.

14. A structure as set forth in claim 13, wherein said drive means further comprises a nut meshing with said shaft and abutting against the upper end portion of said hub.

15. A rotary kneading and agitating tool having an axis of rotation comprising an elongated hub; at least one elongated narrow transversal kneading member connected only at one end thereof to one end of said hub and freely projecting outwardly from the latter, said kneading member being arranged substantially transversally to the axis of said hub, and at least one flat narrow deflecting element projecting from said hub in a plane parallel to said axis and extending from said kneading member toward the other end of said hub, said kneading member and said deflecting element being angularly displaced about said axis of rotation from each other.

16. A rotary kneading and agitating tool as set forth in claim 15, wherein two kneading members are provided arranged diametrically opposite each other and wherein also two deflecting elements are provided diametrically opposite each other and respectively angularly displaced from said kneading members through an angle of substantially 90 degrees.

References Cited
UNITED STATES PATENTS

| | | | |
|---|---|---|---|
| 1,498,392 | 6/1924 | Levy | 259—134 |
| 3,201,095 | 8/1965 | Erwien et al. | 259—108 |
| 1,629,391 | 5/1927 | Kemp et al. | 68—134 |
| 2,722,118 | 11/1955 | Guthrie | 68—134 |
| 3,024,010 | 3/1962 | Sperling | 259—107 |
| 3,211,434 | 10/1965 | Pickles | 68—134 |

ROBERT W. JENKINS, *Primary Examiner.*